Figure 1:
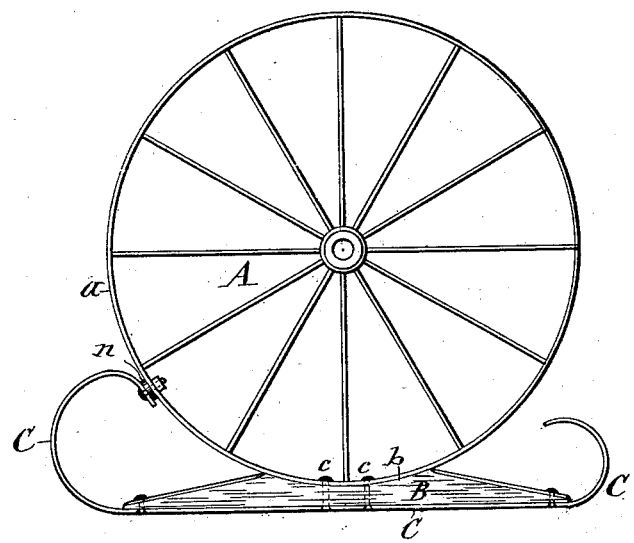

(No Model.)

F. J. AUBEUF.
RUNNER ATTACHMENT FOR VEHICLES.

No. 363,717. Patented May 24, 1887.

WITNESSES:
C. Bendixon
A. F. Walz

INVENTOR
Frank J. Aubeuf
BY
Hull, Laass & Hull
ATTORNEYS

UNITED STATES PATENT OFFICE.

FRANK J. AUBEUF, OF ONEIDA, NEW YORK.

RUNNER ATTACHMENT FOR VEHICLES.

SPECIFICATION forming part of Letters Patent No. 363,717, dated May 24, 1887.

Application filed November 5, 1886. Serial No. 218,030. (No model.)

*To all whom it may concern:*

Be it known that I, FRANK J. AUBEUF, of Oneida, in the county of Madison, in the State of New York, have invented new and useful Improvements in Wheel-Runners, of which the following, taken in connection with the accompanying drawing, is a full, clear, and exact description.

This invention relates to the class of sleigh runners and shoes which are detachably connected to the wheels of a vehicle to convert the latter into a sleigh or sled; and the invention consists in an improved construction and combination of a runner which has elastic ends curved upward and back toward the rim of the wheel and movably connected therewith, and a cushion interposed between the end of the runner and adjacent part of the wheel, all as hereinafter more fully described, and specifically set forth in the claim.

In the annexed drawing is shown a side elevation of the wheel provided with my improved runner attachment.

A represents the wheel, which is composed entirely of metal. The peripheral portion $a$ thereof consists of a circular thin flat steel band.

B denotes a wooden bolster, the top of which is formed with a longitudinal segmental concave seat, $b$, corresponding to the curvature of the tread of the wheel.

C represents the shoe or runner proper, consisting of a thin flat steel bar secured to the bottom of the bolster B, and having elastic ends projecting from the ends of the bolster and curved upward and back toward the rim of the wheel in the usual way, and terminating in proximity thereto. The bolster, with its runner, is detachably connected to the tread of the wheel by a bolt or bolts, $c\ c$, passing vertically through the runner, bolsters, and the rim or tire of the wheel.

The front end of the shoe C is elastic and yieldingly connected to the rim of the wheel by a bolt passing through said parts by a cushion, $n$, of rubber or other suitable material, interposed between the rim of the wheel and end of the runner. The described connection of the shoe or runner with the rim of the wheel, with a rubber pad or cushion interposed between said parts, serves to maintain the runner in line with the wheel, and at the same time allows the end of the runner to yield to undue upward pressure incident to its travel over ordinary obstructions.

I do not claim, broadly, the combination, with a vehicle-wheel, of a sled-runner secured to said wheel and having an elastic front end, as I am aware the same is not new; but I do claim specifically as my invention—

The combination, with the vehicle-wheel, of a runner or shoe secured to said wheel, and having its forward end elastic and curved upward and back toward the rim of the wheel and movably connected therewith, and a cushion interposed between the end of the runner and adjacent part of the rim of the wheel, substantially as described and shown.

In testimony whereof I have hereunto signed my name and affixed my seal, in the presence of two attesting witnesses, at Syracuse, in the county of Onondaga, in the State of New York, this 16th day of October, 1886.

FRANK J. AUBEUF. [L. S.]

Witnesses:
H. P. DENISON,
C. BENDIXON.